United States Patent
Li et al.

(10) Patent No.: US 12,183,924 B2
(45) Date of Patent: Dec. 31, 2024

(54) METAL ORGANIC FRAMEWORK-DERIVED CARBON AEROGEL, PREPARATION METHOD THEREOF AND APPLICATION IN LITHIUM ION BATTERIES

(71) Applicant: Soochow MOFs Science and Technology Ltd., Suzhou (CN)

(72) Inventors: Zuoxi Li, Suzhou (CN); Xiang Fang, Suzhou (CN); Liying Zhang, Suzhou (CN)

(73) Assignee: Soochow MOFs Science and Technology Ltd., Suzhou (CN)

( * ) Notice: Subject to any disclaimer, the term of this patent is extended or adjusted under 35 U.S.C. 154(b) by 0 days.

(21) Appl. No.: 18/795,604

(22) Filed: Aug. 6, 2024

(65) Prior Publication Data
US 2024/0396044 A1 Nov. 28, 2024

Related U.S. Application Data

(63) Continuation of application No. PCT/CN2023/110493, filed on Aug. 1, 2023.

(30) Foreign Application Priority Data

Feb. 23, 2023 (CN) .......................... 202310152543.4

(51) Int. Cl.
*H01M 4/587* (2010.01)
*C01B 32/05* (2017.01)
(Continued)

(52) U.S. Cl.
CPC ............. *H01M 4/587* (2013.01); *C01B 32/05* (2017.08); *H01M 10/0525* (2013.01);
(Continued)

(58) Field of Classification Search
None
See application file for complete search history.

(56) References Cited

U.S. PATENT DOCUMENTS

2017/0222217 A1 8/2017 Wang
2019/0376195 A1* 12/2019 Aziz .................... C25B 11/051

FOREIGN PATENT DOCUMENTS

CN 105390696 A 3/2016
CN 106450206 A 2/2017
(Continued)

OTHER PUBLICATIONS

Pingping Zhou, A Porous Cadmium(II) Framework: Synthesis, Crystal Structure, Gas Adsorption, and Fluorescence Sensing Properties, Journal of Inorganic and General Chemistry, vol. 643, No. 10. pp. 653-656, Date of issue: May 18, 2017 (doi.org/10.1002/zaac. 201600448) Related pages:p. 653, right column, lines 17-25, Related claims: 1-10.

(Continued)

*Primary Examiner* — Wyatt P McConnell
(74) *Attorney, Agent, or Firm* — Pilloff Passino & Cosenza LLP; Rachel Pilloff; Sean Passino

(57) ABSTRACT

The disclosure relates to the technical field of lithium ion batteries, and provides an MOF-derived carbon aerogel, a preparation method thereof and an application in lithium ion batteries. According to the method, $[Cd(tppa)_2Cl_2]$ is first prepared. The MOF-derived carbon aerogel according the disclosure is used as an anode active material of lithium ion batteries.

6 Claims, 10 Drawing Sheets

(51) Int. Cl.
  *H01M 10/0525* (2010.01)
  *H01M 4/02* (2006.01)

(52) U.S. Cl.
  CPC ...... *C01P 2004/03* (2013.01); *C01P 2006/10* (2013.01); *C01P 2006/40* (2013.01); *H01M 2004/021* (2013.01); *H01M 2004/027* (2013.01)

(56) References Cited

FOREIGN PATENT DOCUMENTS

| CN | 105390696 B | 1/2018 |
|----|-------------|--------|
| CN | 108794759 A | 11/2018 |
| CN | 109718727 A | 5/2019 |
| CN | 115991466 A | 4/2023 |

OTHER PUBLICATIONS

Notice of the First Office Action dated Nov. 15, 2023 in SIPO application No. 202310152543.4.
Retrieval report dated Nov. 13, 2023 in SIPO application No. 202310152543.4.
Retrieval report dated Jan. 24, 2024 in SIPO application No. 202310152543.4.
Notification to Grant Patent Right for Invention dated Jan. 26, 2024 in SIPO application No. 202310152543.4.
Netherlands Examiner Opinion dated Jul. 18, 2023 in NL application No. NL2034247 (English on last page).
Fan Yun et al., Emerging porous nanosheets: From fundamental synthesis to promising applications, Nano Research, Tsinghua University Press, CN., vol. 14, No. 1, (2021) published Sep. 29, 2020, pp. 1-28 (DOI: 10.1007/S12274-020-3082-4).

* cited by examiner

METAL ORGANIC FRAMEWORK-DERIVED CARBON AEROGEL, PREPARATION METHOD THEREOF AND APPLICATION IN LITHIUM ION BATTERIES

CROSS-REFERENCE TO RELATED APPLICATIONS

This application is a continuation of PCT/CN2023/110493, filed Aug. 1, 2023 and claims priority of Chinese Patent Application No. 202310152543.4, filed on Feb. 23, 2023, the entire contents of which are incorporated herein by reference.

TECHNICAL FIELD

The disclosure relates to the technical field of lithium ion batteries, in particular to a metal organic framework (MOF)-derived carbon aerogel, a preparation method thereof and an application in lithium ion batteries.

BACKGROUND

The energy crisis is a major problem facing human society in the 21st century. Once fossil energy is consumed, fossil energy may not be replenished in nature in the short term. Lithium-ion battery has become one of the most popular energy storage methods due to many advantages such as long cycle life, high working voltage, high specific energy, good safety performance, high energy density, small self-discharge, rapid charging and discharging and wide working temperature.

The key components of a lithium ion battery include a cathode, an anode, an electrolyte and a separator, and the electrochemical performance of the anode is a key factor affecting the performance of the lithium ion battery. At present, the commonly used anode material for lithium ion batteries is graphite. However, the commercial graphite anode material has disadvantages such as low theoretical capacity, poor layered structure stability and poor rate performance, which restrict the further development of lithium ion batteries. Therefore, it is urgent to develop an anode material with high stability and excellent electrochemical performance.

SUMMARY

In view of this, the disclosure provides an MOF-derived carbon aerogel, a preparation method thereof and an application in lithium ion batteries. The MOF-derived carbon aerogel provided by the disclosure has excellent charge and discharge performance, high specific capacity, extremely high rate performance and super cycle stability.

In order to achieve the above objective, the disclosure provides following technical scheme.

A preparation method of an MOF-derived carbon aerogel includes following steps:
mixing a dichloromethane solution of tris(4-(pyridin-4-yl)phenyl)amine and a methanol solution of $CdCl_2$ for coordination reaction to obtain $[Cd(tppa)_2Cl_2]$; and
performing carbonization of $[Cd(tppa)_2Cl_2]$ under a protective atmosphere to obtain the MOF-derived carbon aerogel.

Optionally, a molar ratio of the tris(4-(pyridin-4-yl)phenyl)amine to $CdCl_2$ is 6-8:2-3; a temperature of the coordination reaction is room temperature.

Optionally, a mode of mixing the dichloromethane solution of tris(4-(pyridin-4-yl)phenyl)amine and the methanol solution of $CdCl_2$ includes a first mode or a second mode; the first mode includes following steps: dropwise adding a dichloromethane solution of tris(4-(pyridin-4-yl)phenyl)amine into a methanol solution of $CdCl_2$;
the second mode includes following steps: putting a dichloromethane solution of tris(4-(pyridin-4-yl)phenyl)amine at a bottom of a reaction vessel, then adding a dichloromethane-methanol mixed solution, and then adding a methanol solution of $CdCl_2$;
when a method of the first mode is used for mixing, a duration of the coordination reaction is 20-30 hours (h);
when a method of the second mode is used for mixing, a duration of the coordination reaction is 24-27 days.

Optionally, the $[Cd(tppa)_2Cl_2]$ is a powder crystal or a single crystal; crystal data of the single crystal is: belonging to monoclinic system $P2_1/c$, and an asymmetric unit includes one $Cd^{II}$ ion, two ligand tppa molecules and two chloride ions.

Optionally, a temperature of the carbonization is 800-1000 degrees Celsius (° C.) and a heat preservation duration is 3-4 h; the protective atmosphere is nitrogen.

The disclosure also provides the MOF-derived carbon aerogel prepared by the preparation method described in the above scheme, and a density of the MOF-derived carbon aerogel is 0.2-0.4 milligram per cubic centimeter ($mg/cm^3$), and a porosity is 85-95%.

The disclosure also provides an application of the MOF-derived carbon aerogel as an anode active material in lithium ion batteries.

The disclosure also provides a lithium ion battery anode, and an anode active material used by the lithium ion battery anode is the MOF-derived carbon aerogel described in the above scheme.

Optionally, the lithium ion battery anode includes a current collector and an active material layer coated on a surface of the current collector; compositions of the active material layer include an anode active material, a conductive agent and a binder.

The disclosure also provides a lithium ion battery, and an anode of the lithium ion battery is the lithium ion battery anode described in the above scheme.

The disclosure provides a preparation method of an MOF-derived carbon aerogel, including following steps: mixing a dichloromethane solution of tris(4-(pyridin-4-yl)phenyl)amine and a methanol solution of $CdCl_2$ for coordination reaction to obtain $[Cd(tppa)_2Cl_2]$; and calcining the $[Cd(tppa)_2Cl_2]$ under a protective atmosphere to obtain the MOF-derived carbon aerogel. According to the disclosure, $[Cd(tppa)_2Cl_2]$ is first prepared, where $[Cd(tppa)_2Cl_2]$ is a macroporous metal organic frameworks (MOFs) material and is used for carbonizing, The obtained MOF-derived carbon aerogel has the characteristics of porosity and light weight, so that lithium ions may have more lithium storage space in the lithium intercalation process, and the performance of the material remains stable after repeated cycles. The MOF-derived carbon aerogel according to the disclosure is used as the anode active material of lithium ion batteries, and has excellent electrochemical performance, ultra-long cycle capacity and extremely high rate performance, and high reversible capacity at a small current density, so the MOF-derived carbon aerogel is hopeful to replace graphite and become the commercialized anode material of a new generation of lithium ion batteries.

The results of the embodiments show that the MOF-derived carbon aerogel according to the disclosure is used as an anode active material for the preparation of the lithium ion battery, and the obtained lithium ion battery has an operating voltage of 0.01-3.5 volt (V). The specific capacity of the lithium ion battery is as high as 500 milliampere-hour per gram (mAh/g) after cycling for 170 cycles at a current density of 0.5 ampere per gram (A/g), and the lithium ion battery may stably cycle for 10,000 cycles at a high current density of 10 A/g.

DETAILED DESCRIPTION OF THE EMBODIMENTS

Figure 10:
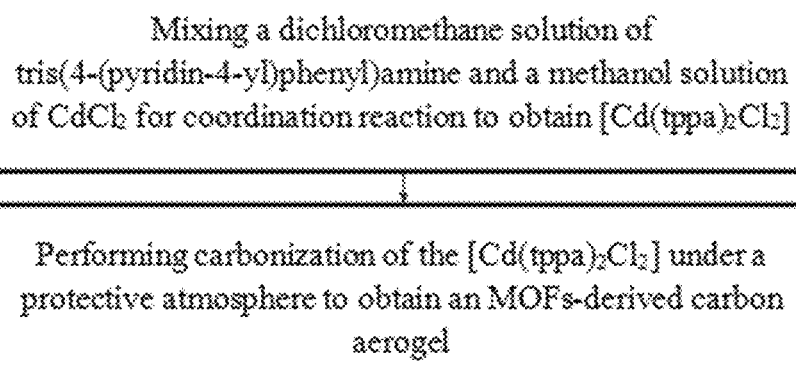
FIG. 10 is a flow chart of a preparation method of an MOF-derived carbon aerogel.

The disclosure provides a preparation method of an MOF-derived carbon aerogel, as shown in FIG. 10, including following steps:

mixing a dichloromethane solution of tris(4-(pyridin-4-yl)phenyl)amine and a methanol solution of $CdCl_2$ for coordination reaction to obtain $[Cd(tppa)_2Cl_2]$; and performing carbonization of the $[Cd(tppa)_2Cl_2]$ under a protective atmosphere to obtain the MOF-derived carbon aerogel.

In the disclosure, a dichloromethane solution of tris(4-(pyridin-4-yl)phenyl)amine and a methanol solution of $CdCl_2$ are mixed for coordination reaction to obtain $[Cd(tppa)_2Cl_2]$. In the disclosure, tris(4-(pyridin-4-yl)phenyl)amine is abbreviated as tppa; a molar ratio of the tris(4-(pyridin-4-yl)phenyl)amine to $CdCl_2$ is preferably 6-8:2-3, more preferably 6:2; a concentration of the dichloromethane solution of tris(4-(pyridin-4-yl)phenyl)amine is preferably 0.075-0.013 mole per liter (mol/L), more preferably 0.01 mol/L; a concentration of the methanol solution of $CdCl_2$ is preferably 0.0025-0.005 mol/L, more preferably 0.003-0.004 mol/L; a mode of mixing the dichloromethane solution of tris(4-(pyridin-4-yl)phenyl)amine and the methanol solution of $CdCl_2$ includes a first mode or a second mode; the first mode includes following steps: dropwise adding a dichloromethane solution of tris(4-(pyridin-4-yl)phenyl)amine into a methanol solution of $CdCl_2$; the disclosure preferably includes following steps: firstly, placing a methanol solution of $CdCl_2$ in a conical flask, and then dropwise adding a dichloromethane solution of tris(4-(pyridin-4-yl)phenyl)amine through a constant pressure dropping funnel; the second mode includes following steps: placing the dichloromethane solution of tris(4-(pyridin-4-yl)phenyl)amine at a bottom of a reaction vessel, then adding a dichloromethane-methanol mixed solution, and then adding a methanol solution of $CdCl_2$; a volume ratio of dichloromethane to methanol in the dichloromethane-methanol mixed solution is preferably 1:1, and a volume ratio of the dichloromethane solution of tris(4-(pyridin-4-yl)phenyl)amine to dichloromethane-methanol mixed solution is preferably 6-8:8-10; the reaction vessel is preferably a test tube. In the disclosure, the first mode is used for the synthesis of powder crystals, which meets the requirements of rapid industrialization, and the second mode may culture and obtain a white bulk single crystal structure suitable for X-ray structural analysis.

In the disclosure, a temperature of the coordination reaction is preferably room temperature, and when the first mode is used for mixing, a duration of the coordination reaction is preferably 20-30 h, specifically, the obtained mixed solution is stirred at room temperature for 8-13 h, and then allowed to stand for 12-17 h; when the second mode is used for mixing, a duration of the coordination reaction is 24-28 days, specifically, the obtained mixed liquid is sealed and allowed to stand for reaction.

After the coordination reaction is completed, according to the disclosure, preferably, the obtained mother liquor is filtered, and the obtained precipitate is washed and dried to obtain $[Cd(tppa)_2Cl_2]$ (denoted as MOF-ZX-4); a washing detergent is preferably ethanol, a drying temperature is preferably 70° C., and the MOF-ZX-4 obtained after drying is white powder.

In the disclosure, the $[Cd(tppa)_2Cl_2]$ is a powder crystal or a single crystal; crystal data of the single crystal is that the single crystal belongs to monoclinic system $P2_1/c$, and an asymmetric unit includes one $Cd^{II}$ ion, two ligand tppa molecules and two chloride ions.

After obtaining $[Cd(tppa)_2Cl_2]$, according to the disclosure, the $[Cd(tppa)_2Cl_2]$ is carbonized under a protective atmosphere to obtain the MOF-derived carbon aerogel. In the disclosure, the temperature of the carbonization is preferably 800-1000° C., more preferably 800-900° C., a heating rate to the temperature of the carbonization is preferably 5 degrees Celsius per minute (° C./min), and a heat preservation duration of the carbonization is preferably 3-4 h, more preferably 3-3.5 h; the protective atmosphere is preferably nitrogen; the carbonization is preferably carried out in a tube furnace. After carbonization, the product is naturally cooled to room temperature.

The disclosure also provides the MOF-derived carbon aerogel prepared by the preparation method described in the above scheme, and a density of the MOF-derived carbon aerogel is preferably 0.2-0.4 mg/cm³, and a porosity is preferably 85-95%.

The disclosure also provides an application of the MOF-derived carbon aerogel in the lithium ion batteries as an anode active material. The MOF-derived carbon aerogel provided by the disclosure have the characteristics of light weight and porosity, is used as an anode active material of a lithium ion battery, has excellent electrochemical performance, good cycle stability, high rate performance and high reversible capacity at a small current density, and is expected to replace graphite as a new generation of anode materials for lithium ion batteries.

The disclosure also provides a lithium ion battery anode, and an anode active material used by the lithium ion battery anode is the MOF-derived carbon aerogel described in the above scheme. In the disclosure, the lithium ion battery anode preferably includes a current collector and an active material layer coated on a surface of the current collector; compositions of the active material layer include an anode active material, a conductive agent and a binder; the conductive agent is preferably acetylene black, and the binder is preferably polyvinylidene fluoride (PVDF); a mass ratio of the anode active material, the conductive agent and the binder is preferably 7:1:2; and the disclosure has no special requirement on the type of the current collector, and it is sufficient to use those known to those skilled in the art, specifically such as copper foil. In the disclosure, when the anode is a disk with a diameter of 12 centimeters (cm), the load of the anode active material in the lithium ion battery anode is preferably 1 to 2 milligram per piece (mg)/piece.

The disclosure has no special requirements on the preparation method of the lithium ion battery anode, and it is sufficient to use the method known to the skilled person in the art, for example, mixing the anode active material, the conductive agent and the binder, adding an appropriate amount of N-methylpyrrolidone solvent, uniformly mixing, coating the obtained slurry on the surface of the current collector, and drying.

The disclosure also provides a lithium ion battery, where an anode of the lithium ion battery is the lithium ion battery anode described in the above scheme. In the disclosure, the lithium ion battery includes a cathode, an anode, a separator and an electrolyte, and the disclosure has no special requirements on the types of the cathode, the separator and the electrolyte, and only those familiar to those skilled in the art may be used. In the specific embodiment of the disclosure, the cathode is preferably a lithium sheet, the separator is preferably Celgard 2500, and the electrolyte is preferably a $LiPF_6$ solution. A solvent of the electrolyte is preferably a mixed solvent of ethylene carbonate (EC) and dimethyl carbonate (DMC), and the volume ratio of EC to DMC in the mixed solvent is preferably 3:7 or 1:1; the concentration of $LiPF_6$ in the electrolyte is preferably 1 mol/L; additives may also be added to the electrolyte, preferably fluoroethylene carbonate (FEC), and the mass fraction of FEC in the electrolyte is preferably 5%.

The technical scheme in the disclosure will be described clearly and completely in combination with the embodiments in the disclosure. Obviously, the described embodiments are only part of the embodiments of the disclosure, but not all of the embodiments. Based on the embodiments in the disclosure, all other embodiments obtained by ordinary technicians in the field without creative labor belong to the protection scope of the disclosure.

Embodiment 1

0.6 millimolar (mmol) tppa and 0.2 mmol $CdCl_2$ are dissolved in dichloromethane (60 millilitre (mL)) and methanol (60 mL) respectively to obtain clear solutions. $CdCl_2$ methanol solution is poured into a conical flask, and then tppa dichloromethane solution is slowly dropped into the methanol solution through a constant pressure dropping funnel. The mixture is stirred at room temperature for 8 h, left standing for 12 h, then filtered, and white precipitate is collected and then washed with 10 mL of ethanol for 3 times, and the white powder is dried at 70° C. to obtain MOF-ZX-4 with a yield of about 60%. White MOF-ZX-4 is put into a tube furnace, heated to 800° C. at a rate of 5° C./min under a nitrogen atmosphere, and naturally cooled to room temperature after 3 h, and an MOF-derived carbon aerogel product is obtained.

In addition, MOF-ZX-4 single crystal is prepared for structural analysis. A preparation method of the single crystal is as follows: the ligand tris(4-(pyridin-4-yl)phenyl) amine (tppa, 0.06 mmol) is dissolved in dichloromethane (6 mL), placed at a bottom of a test tube, and 8 mL of dichloromethane/methanol mixed solution is carefully added, and then $CdCl_2$ (0.02 mmol) methanol solution (6 mL) is added. After sealing and standing for 24 days, a white massive single crystal suitable for X-ray structural analysis is precipitated on the test tube wall.

The mother liquor after the reaction is filtered, washed with ethanol (10 ml) for three times, and dried in vacuum to obtain MOF-ZX-4 single crystal with a yield of about 30%.

The single crystal structure of MOF-ZX-4 is analyzed. The results show that a space group of MOF-ZX-4 belongs to monoclinic system $P2_1/c$, and an asymmetric unit includes one $Cd^{II}$ ion, two ligand tppa molecules and two chloride ions.

Figure 1:
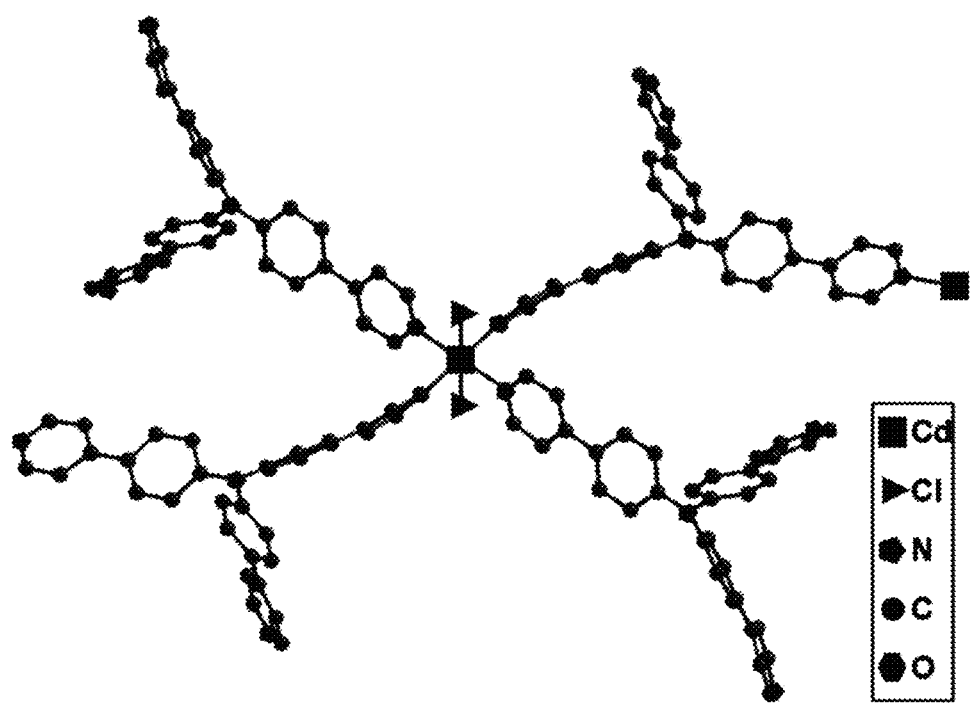
FIG. 1 is a $Cd^{II}$ ion coordination configuration diagram of MOF-ZX-4.

FIG. 1 is a $Cd^{II}$ ion coordination configuration diagram of MOF-ZX-4. Each $Cd^{II}$ ion is coordinated with four nitrogen atoms from different tppa molecules and two chloride ions to form an octahedral coordination configuration. The Cd—N coordination bond in the equatorial plane is between 2.180-2.196 angstrom (Å), while the Cd—Cl coordination bond in the axial direction is as long as 2.557 Å. Therefore, there is an obvious Jahn-Teller effect for $Cd^{II}$ ions.

Figure 2:
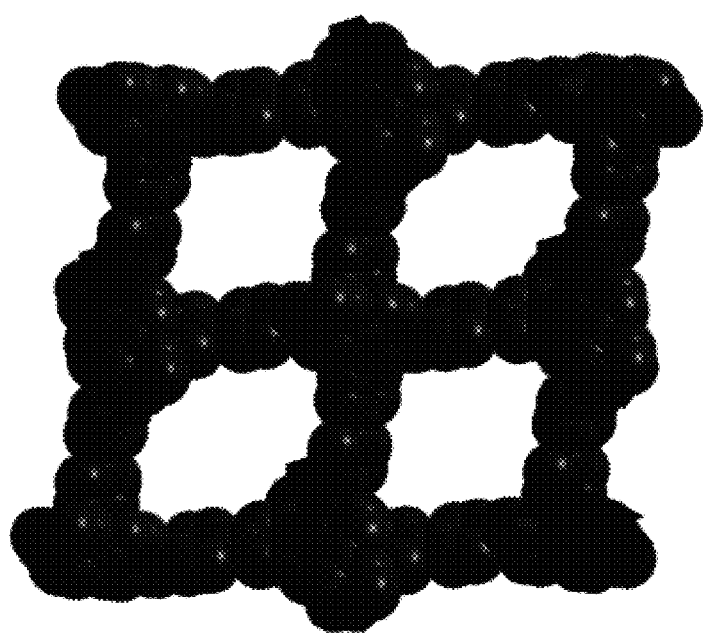
FIG. 2 is a "diamond" (4,4) network diagram of MOF-ZX-4.

FIG. 2 is a "diamond" (4,4) network diagram of MOF-ZX-4. According to FIG. 2, it may be seen that although tppa molecule has three nitrogen atoms, only two nitrogen atoms participate in the coordination during the assembly process, that is, each tppa ligand bridges two $Cd^{II}$ ions to obtain a two-dimensional "diamond" (4,4) network with a lattice size of 12.5×12.5 Å$^2$ and a pore size of nanometer scale.

Figure 3:
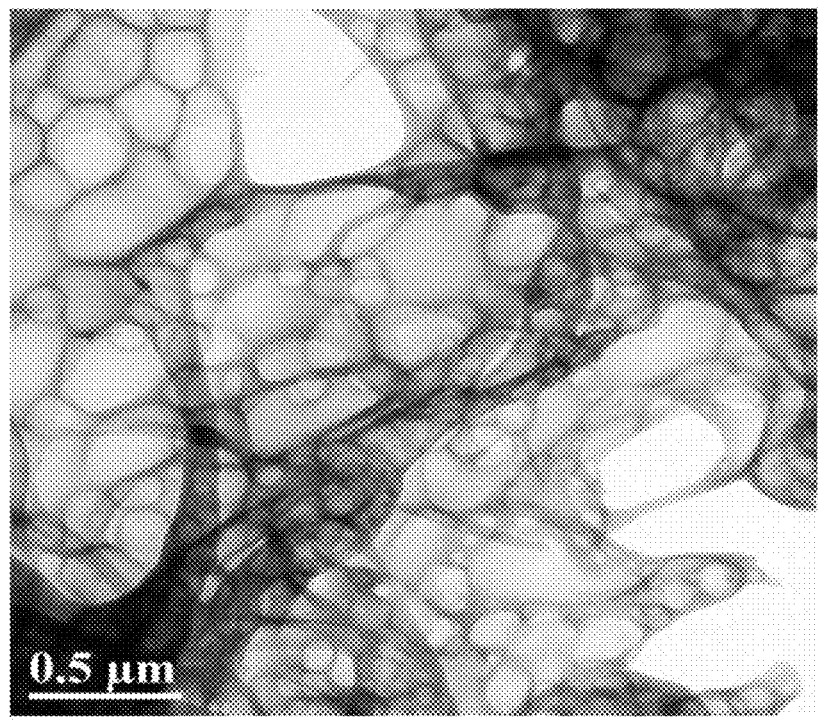
FIG. 3 is a scanning electron microscope (SEM) image of an MOF-derived carbon aerogel product prepared in Embodiment 1.

FIG. 3 is an SEM image of the obtained MOF-derived carbon aerogel product. According to FIG. 3, it may be seen that the MOF-derived carbon aerogel product has a flaky structure, a few layers, a thin thickness, a smooth and smooth surface and a translucent silk shape.

Embodiment 2

In this embodiment, the electrochemical performance of the electrode material is tested by using a half cell, and the half cell mainly consists of five parts: a cathode, an anode, a separator, an electrolyte and a battery case, where the cathode is a lithium sheet, the anode is a mixed material consisting of MOF-ZX-4-derived carbon aerogel, acetylene black and a binder, the separator is Celgard 2500, and the electrolyte in the electrolyte is 1 mol/L $LiPF_6$, and the solvent is a mixed solvent of EC and DMC (volume ratio is 3:7);

the anode is prepared as follows:
(1) the MOF-derived carbon aerogel prepared in Embodiment 1, acetylene black and PVDF are mixed according to a mass ratio of 7:1:2, and an appropriate amount of N-methylpyrrolidone solvent is added to mix the mixture evenly to obtain a slurry; and
(2) the slurry is evenly coated on a copper foil by a coater, the copper foil is dried in a vacuum oven at 70° C. for 10 h and then cut into electrode pieces with a diameter of 12 cm, and the electrode pieces are weighed and put into a glove box containing inert gas to assemble the battery.

Figure 4:
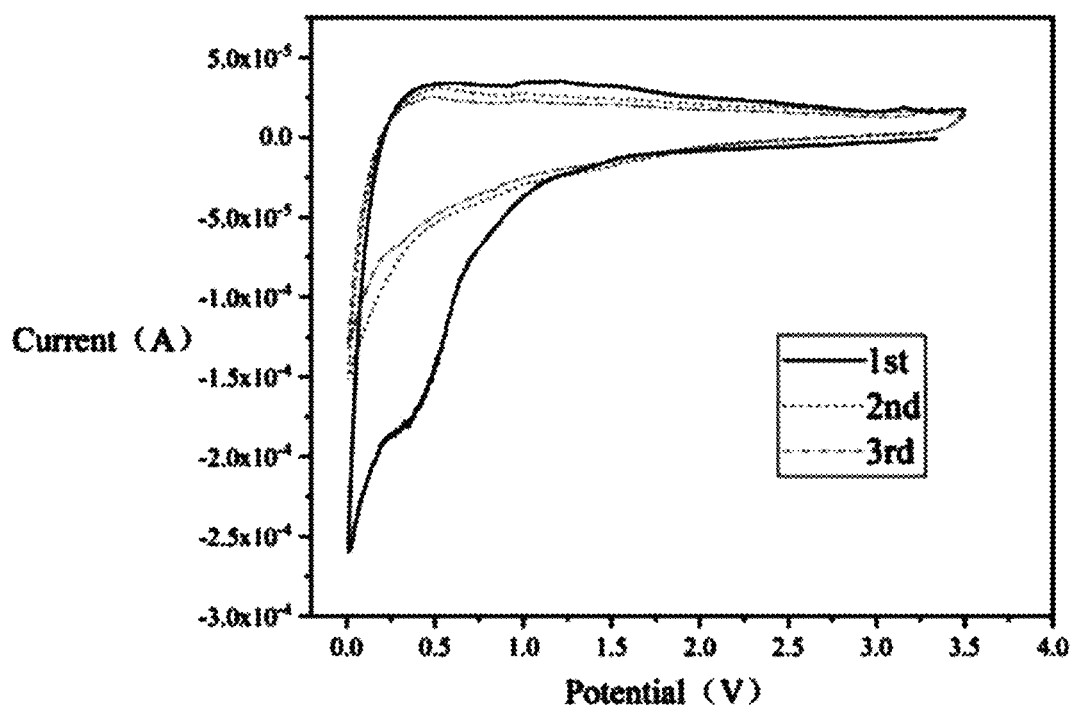
FIG. 4 is a cyclic voltammetry (CV) diagram of a half cell assembled by using an MOF-derived carbon aerogel in Embodiment 2 at a scan rate of 0.1 meter per second (m/s), and test results are shown in FIG. 3.

The assembled half cell is subjected to a CV test using Shanghai Chenhua CHI660E electrochemical workstation at a scan rate of 0.1 m/s, and the test results are shown in FIG. 4. The results in FIG. 4 show that, except for the irreversible process of the electrode material in the first scan (mainly due to the formation of solid electrolyte interface (SEI) membrane and the decomposition of electrolyte), the subsequent second and third cycles have no obvious changes, showing good cycle stability and reversibility.

Figure 5:
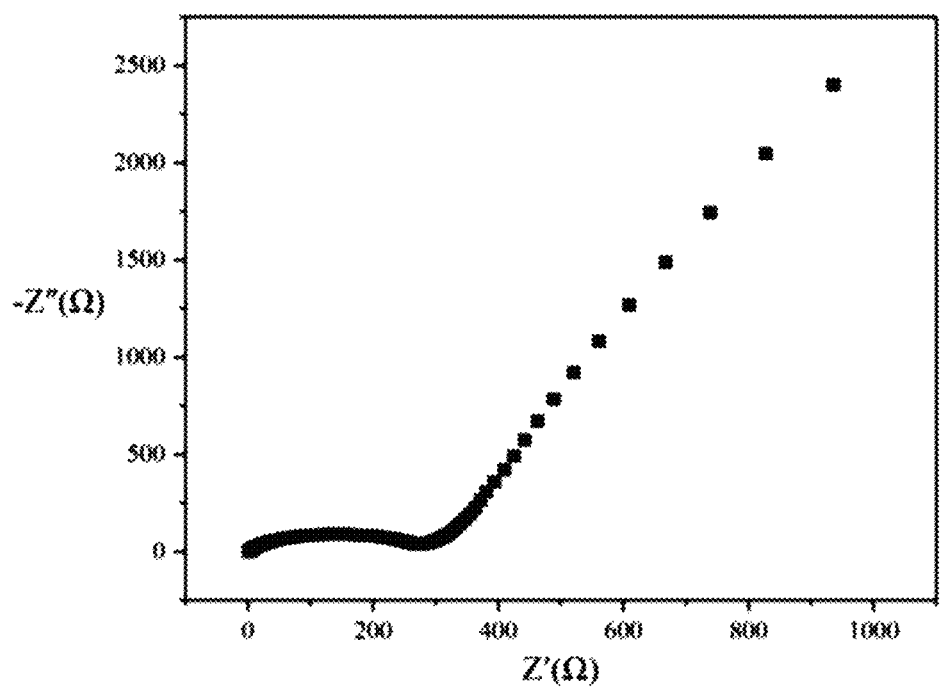
FIG. 5 is a Nyquist diagram of the half cell assembled by using the MOF-derived carbon aerogel in Embodiment 2.

The electrochemical impedance spectrum of the assembled half cell is tested by Shanghai Chenhua CHI660E electrochemical workstation, and the test results are shown in FIG. 5. In FIG. 5, the image of alternative impedance test consists of semicircles and straight lines. The diameter of semicircles represents the difficulty of charge transfer when electrochemical reaction occurs in the battery, and the straight line represents the difficulty of lithium ion diffusion in the electrode material. According to the results in FIG. 5, it may be seen that the impedance (Re+Rsf+Rst) value is slightly lower than 300, and the impedance value is relatively high.

Figure 6:
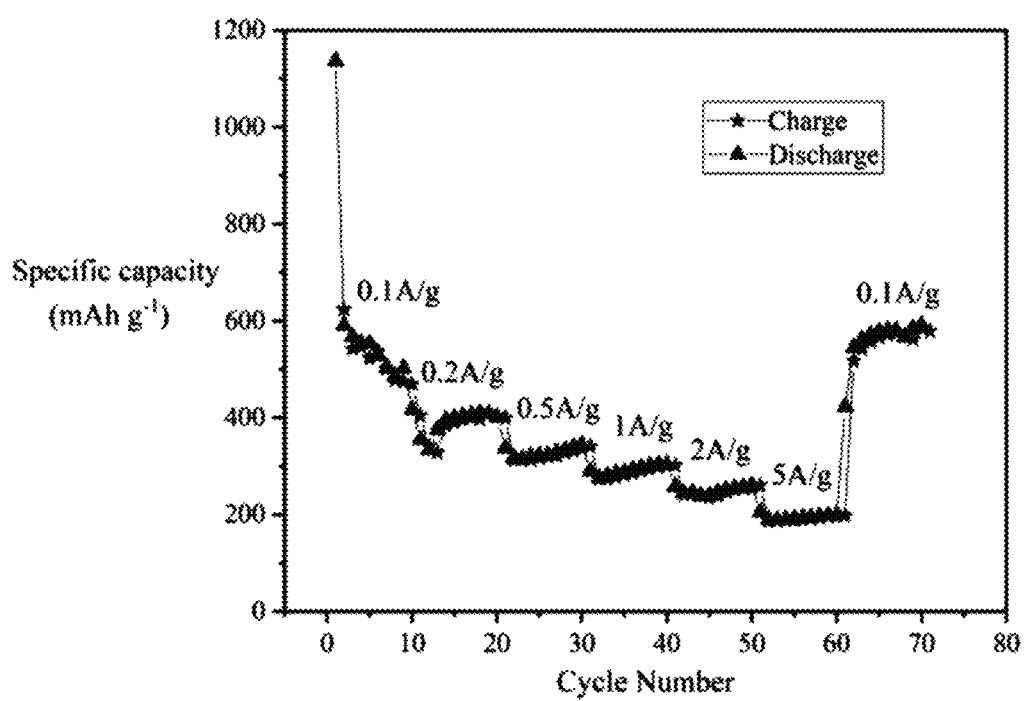
FIG. 6 is a diagram showing rate performance of the half cell assembled by using the MOF-derived carbon aerogel in Embodiment 2 at currents of 0.1 A/g, 0.2 A/g, 0.5 A/g, 1 A/g, 2 A/g, 5 A/g and 0.1 A/g.

The rate performance of the above half-cell is tested in the LAND test system at currents of 0.1 A/g, 0.2 A/g, 0.5 A/g, 1 A/g, 2 A/g, 5 A/g and 0.1 A/g, and the test results are shown in FIG. 6. The results in FIG. 6 show that the half cell assembled with the MOF-derived carbon aerogel according to the disclosure may maintain a reversible specific capacity of 200 milliampere-hour per gram (mAh $g^{-1}$) at a high current of 5 ampere (A), and the discharge specific capacity may be restored to 600 mAh $g^{-1}$ when the current density returns to 0.1 A, indicating that the structure of the material remains intact after the high current passes, showing excellent rate performance.

Figure 7:
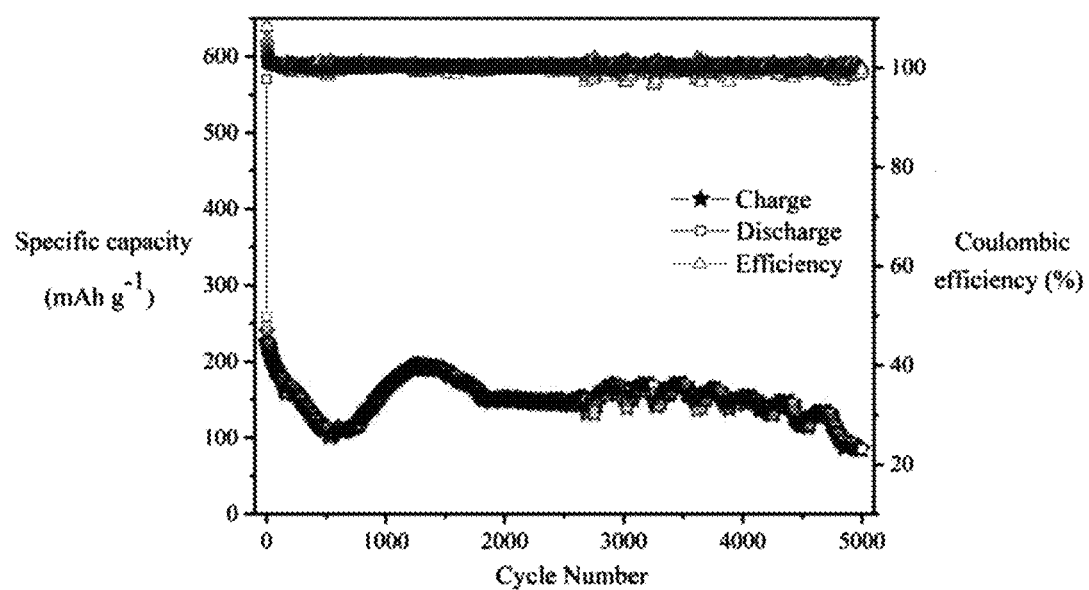
FIG. 7 is a diagram showing cycle performance of the half cell assembled by using the MOF-derived carbon aerogel in Embodiment 2 at a current of 5 A/g.
Figure 8:
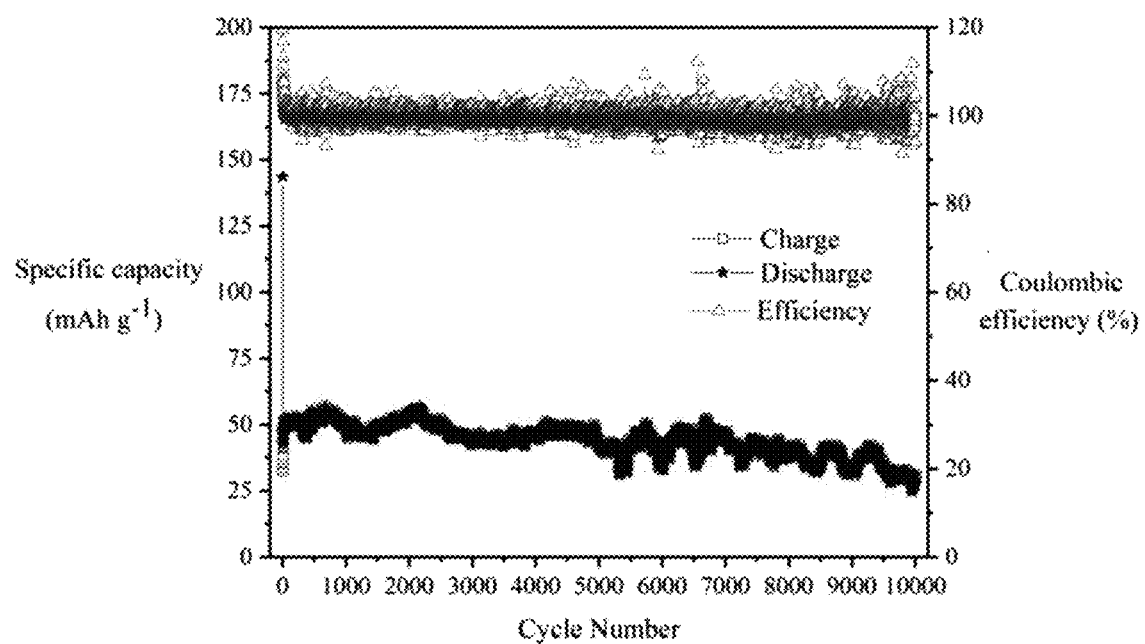
FIG. 8 is a diagram showing cycle performance of the half cell assembled by using the MOF-derived carbon aerogel in Embodiment 2 at a current of 10 A/g.

The cycle stability of the half cell under high currents is tested in the LAND test system. FIG. 7 is a diagram showing cycle performance of the MOF-ZX-4-derived carbon aerogel at a current of 5 A/g, and FIG. 8 is a diagram showing cycle performance of the MOF-ZX-4-derived carbon aerogel at a current of 10 A/g. It may be seen from FIG. 7 to FIG. 8 that the capacity may be kept at 100 mAh $g^{-1}$ after 5000 cycles at a current density of 5 A/g, and the specific discharge capacity may reach 30 mAh/g even after 10000 cycles at a current density of 10 A/g.

Embodiment 3

In this embodiment, the structure of the lithium ion battery is basically the same as that of Embodiment 1, but the electrolyte composition is slightly different. In this embodiment, the electrolyte is 1 mol/L $LiPF_6$, and the solvent is a mixed solvent of EC and DMC (volume ratio is 1:1), plus 5% FEC additive.

Figure 9:
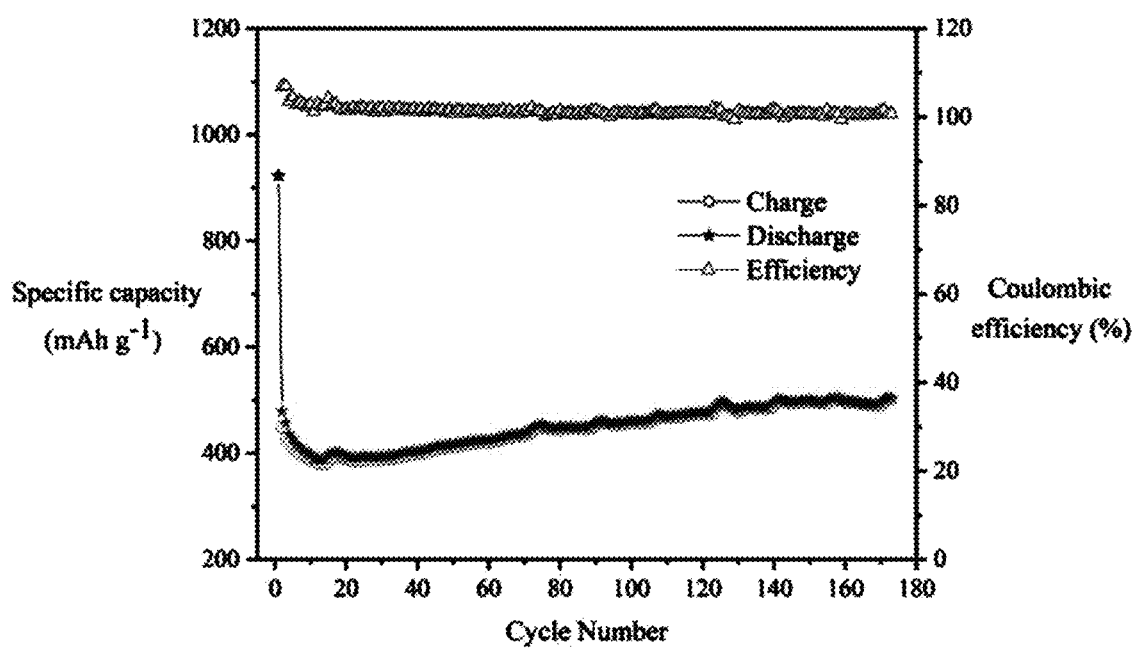
FIG. 9 is a diagram showing cycle performance of the half cell assembled by using the MOF-derived carbon aerogel in Embodiment 2 at a current of 0.5 A/g.

The electrochemical performance of the half cell is tested by the LAND test system, and the constant current test is carried out at a current density of 0.5 A/g under the condition of 0.01-3.5 V. The test results are shown in FIG. 9. The results in FIG. 9 show that the reversible capacity of the half cell in this embodiment may reach 500 mAh $g^{-1}$ after 170 cycles at a current density of 0.5 A/g.

The results of the above embodiments show that the MOF-derived carbon aerogel prepared by using MOF-ZX-4 as a precursor is applied to the lithium ion battery anode as an active material, and has better charging and discharging performance, higher discharge specific capacity, extremely high rate performance and super cycle stability.

The above is only the preferred embodiment of the disclosure, and it should be pointed out that a person skilled in the art may make several improvements and embellishments without departing from the principle of the disclosure, and these improvements and embellishments should also be regarded as the protection scope of the disclosure.

What is claimed is:

1. A preparation method of an MOFs-derived carbon aerogel, comprising following steps:
    mixing a dichloromethane solution of tris(4-(pyridin-4-yl)phenyl)amine and a methanol solution of $CdCl_2$ for coordination reaction to obtain $[Cd(tppa)_2Cl_2]$; and performing carbonization of the $[Cd(tppa)_2Cl_2]$ under a protective atmosphere to obtain the MOFs-derived carbon aerogel, wherein a molar ratio of the tris(4-(pyridin-4-yl)phenyl)amine to $CdCl_2$ is 6-8:2-3, a temperature of the coordination reaction is room temperature;
    a mode of mixing the dichloromethane solution of tris(4-(pyridin-4-yl)phenyl)amine and the methanol solution of $CdCl_2$ comprises a first mode or a second mode; the first mode comprises following steps: dropwise adding the dichloromethane solution of tris(4-(pyridin-4-yl)phenyl)amine into the methanol solution of $CdCl_2$;
    the second mode comprises following steps: putting the dichloromethane solution of tris(4-(pyridin-4-yl)phenyl)amine at a bottom of a reaction vessel, then adding a dichloromethane-methanol mixed solution, and then adding the methanol solution of $CdCl_2$;
    when a method of the first mode is used for mixing, a duration of the coordination reaction is 20-30 h; when a method of the second mode is used for mixing, a duration of the coordination reaction is 24-27 days;
    the $[Cd(tppa)_2Cl_2]$ is a powder crystal or a single crystal; crystal data of the single crystal is: belonging to monoclinic system $P2_1/c$, and an asymmetric unit comprises one $Cd^{II}$ ion, two ligand tppa molecules and two chloride ions.

2. The preparation method according to claim 1, wherein a temperature of the carbonization is 800-1000° C. and a heat preservation duration is 3-4 h; and the protective atmosphere is nitrogen.

3. An MOFs-derived carbon aerogel prepared by the preparation method according to claim 1, wherein a density of the MOFs-derived carbon aerogel is 0.2-0.4 mg/cm$^3$, and a porosity is 85-95%.

4. A lithium ion battery anode, wherein an anode active material used by the lithium ion battery anode is the MOFs-derived carbon aerogel according to claim 3.

5. The lithium ion battery anode according to claim 4, wherein the lithium ion battery anode comprises a current collector and an active material layer coated on a surface of the current collector; compositions of the active material layer comprise an anode active material, a conductive agent and a binder.

6. A lithium ion battery, wherein an anode of the lithium ion battery is the lithium ion battery anode according to claim 4.

* * * * *